United States Patent
Kennedy

(10) Patent No.: US 8,205,263 B1
(45) Date of Patent: Jun. 19, 2012

(54) SYSTEMS AND METHODS FOR IDENTIFYING AN EXECUTABLE FILE OBFUSCATED BY AN UNKNOWN OBFUSCATOR PROGRAM

(75) Inventor: Mark Kennedy, Redondo Beach, CA (US)

(73) Assignee: Symantec Corporation, Mountain View, CA (US)

( * ) Notice: Subject to any disclaimer, the term of this patent is extended or adjusted under 35 U.S.C. 154(b) by 847 days.

(21) Appl. No.: 12/335,890

(22) Filed: Dec. 16, 2008

(51) Int. Cl.
*G06F 21/00* (2006.01)
*G06F 12/14* (2006.01)
*G06F 11/10* (2006.01)
*G06F 12/16* (2006.01)
*G08B 23/00* (2006.01)
*H04L 9/32* (2006.01)

(52) U.S. Cl. ............ 726/25; 713/178; 713/188; 726/24; 726/26

(58) Field of Classification Search .................. None
See application file for complete search history.

(56) References Cited

U.S. PATENT DOCUMENTS

| 6,980,992 B1 * | 12/2005 | Hursey et al. ........................ 1/1 |
| 2006/0037080 A1 * | 2/2006 | Maloof ............................ 726/24 |
| 2006/0095971 A1 * | 5/2006 | Costea et al. ................... 726/26 |
| 2006/0236397 A1 * | 10/2006 | Horne ............................. 726/24 |
| 2009/0044024 A1 * | 2/2009 | Oberheide et al. ............. 713/188 |
| 2009/0094459 A1 * | 4/2009 | Schneider ..................... 713/178 |

* cited by examiner

*Primary Examiner* — Shin-Hon Chen
(74) *Attorney, Agent, or Firm* — Holland & Hart LLP

(57) ABSTRACT

A method for analyzing an unverified executable file within an antivirus engine in order to identify the executable file as being obfuscated by an unknown obfuscator program is described. An unverified executable file comprising obfuscated library strings is received. A list of pre-verified library strings is accessed. A determination is made as to whether the unverified executable file comprises one or more of the pre-verified library strings. The unverified executable file is identified as being obfuscated by an unknown obfuscator program if the file does not comprise one or more of the pre-verified library strings.

20 Claims, 6 Drawing Sheets

SYSTEMS AND METHODS FOR IDENTIFYING AN EXECUTABLE FILE OBFUSCATED BY AN UNKNOWN OBFUSCATOR PROGRAM

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems are used to carry out several business, industry, and academic endeavors. For example, computer systems are used to complete transactions, store data, provide information, etc.

Performance instructions may be transferred to a computer system by way of an executable file. An executable file may cause the computer system to perform indicated tasks according to instructions, as opposed to a file that only includes data. The contents of an executable file may be substantial in size. In some example, the contents of the executable file may be compressed by a compressing program that uses a compression algorithm. In addition, the instructions are encoded in some manner to deter reverse engineering of the executable file. Often times, the contents of the executable file may be obfuscated to conceal the contents from other parties in order to protect the intellectual property aspects of the executable file.

Executable files may also be used to introduce malicious code to a computer system (such as a virus). Developers of such malicious code may use an obfuscator program to prevent the virus from being detected by an antivirus engine, for example. Executable files that are obfuscated by known obfuscator programs may be less likely to include malicious obfuscated code among the legitimate obfuscated code. As such, benefits may be realized by improving the detection of executable files whose content has not been obfuscated by a trusted, known program. In particular, benefits may be realized by providing improved systems and methods for identifying an executable file that has been obfuscated by an unknown obfuscator program.

SUMMARY

According to at least one embodiment, a method for analyzing an unverified executable file within an antivirus engine in order to identify the executable file as being obfuscated by an unknown obfuscator program is described. An unverified executable file comprising obfuscated library strings may be received. A list of pre-verified library strings may be accessed. A determination may be made as to whether the unverified executable file comprises one or more of the pre-verified library strings. The unverified executable file may be identified as being obfuscated by an unknown obfuscator program if the file does not comprise one or more of the pre-verified library strings.

In one embodiment, the unverified executable file may be processed according to an unverified file policy if the file is identified as being obfuscated by an unknown obfuscator program. The unknown obfuscator program may be a binary packer program configured to obfuscate the contents of the unverified executable file.

In one configuration, multiple executable files comprising library strings may be provided. The executable files may comprise code that is not obfuscated or compressed. One or more library strings included in each of the multiple executable files may be identified. In one embodiment, the list of pre-verified library strings is generated that comprises the one or more library strings included in each of the multiple executable files.

The unverified file policy may comprise instructions to delete the unverified executable file, provide an inquiry to a user regarding the processing of the unverified executable file, or block the execution of the unverified executable file.

A computer system that is configured to identify an unverified executable file as being obfuscated by an unknown obfuscator program is also described. The computer system includes a processor and memory in electronic communication with the processor. The computer system also includes a monitoring module. The module may be configured to receive an unverified executable file comprising obfuscated library strings and access a list of pre-verified library strings. The monitoring module may also be configured to determine if the unverified executable file comprises one or more of the pre-verified library strings, and identify the unverified executable file as being obfuscated by an unknown obfuscator program if the file does not comprise one or more of the pre-verified library strings.

A computer-program product for identifying an unverified executable file as being obfuscated by an unknown obfuscator program is also described. The computer-program product includes a computer-readable medium having instructions thereon. The instructions may include code programmed to receive an unverified executable file comprising obfuscated library strings, and code programmed to access a list of pre-verified library strings. The instructions may also include code programmed to determine if the unverified executable files comprises one or more of the pre-verified library strings, and code programmed to identify the unverified executable file as being obfuscated by an unknown obfuscator program if the file does not comprise one or more of the pre-verified library strings.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
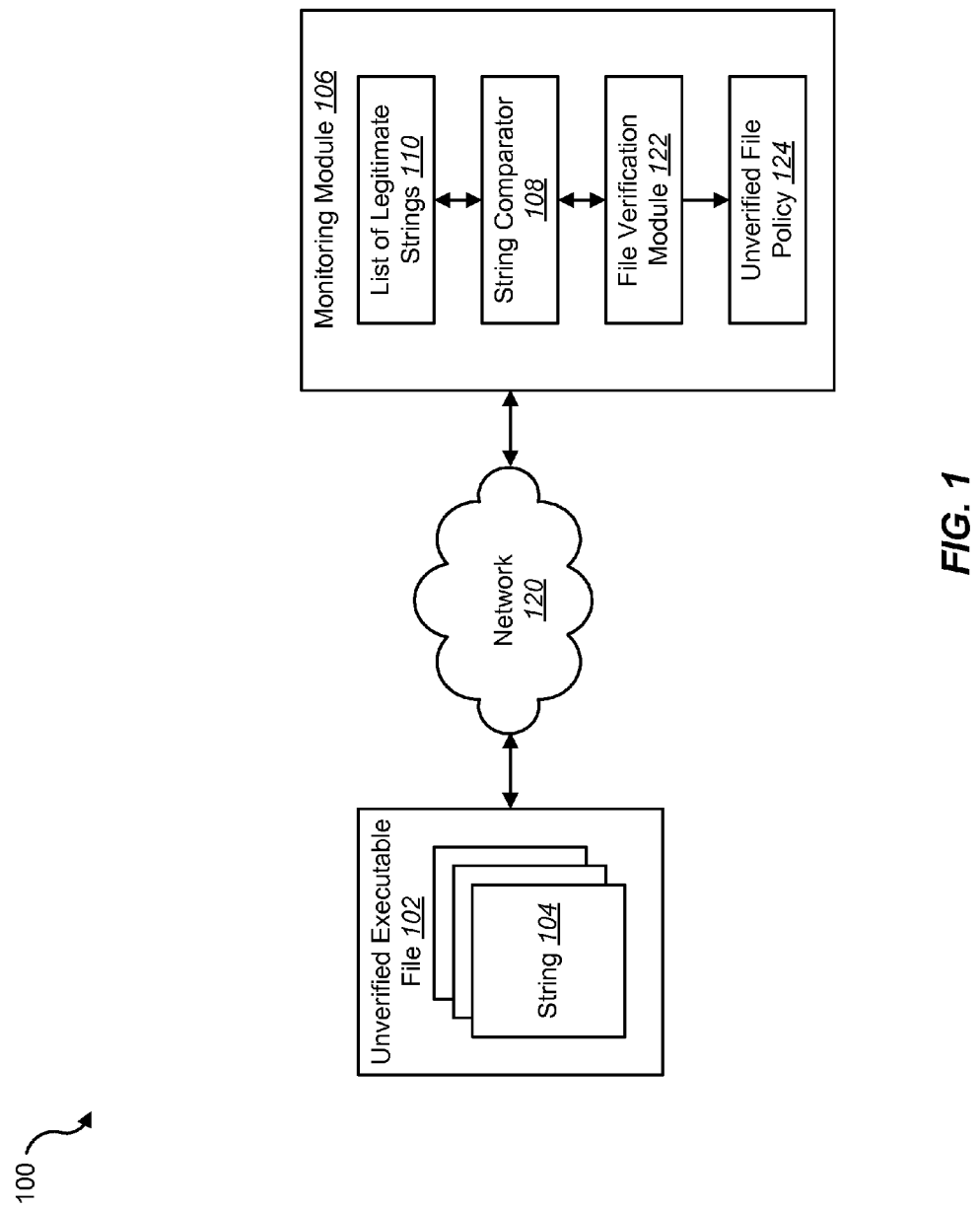
FIG. 1 is a block diagram illustrating one embodiment of a system for identifying an executable file that may be obfuscated in some manner by an unknown obfuscator program.

While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

FIG. 1 is a block diagram illustrating one embodiment of a system 100 for identifying an executable file that may be obfuscated in some manner by an unknown obfuscator program. In some instances, an obfuscator program may obfuscate portions of legitimate code within an executable file in order deter reverse engineering, disassembly, or decompilation. However, an obfuscator program may also obfuscate malicious code within the executable file in order to evade detection by an antivirus engine, for example. An executable file that is obfuscated by a known obfuscator program may be less likely to include obfuscated malicious code than a file that is obfuscated by an unknown obfuscator program.

In one embodiment, the system 100 may include a monitoring module 106 that monitors and evaluates an unverified executable file 102. In one configuration, the monitoring module 106 may be an antivirus engine installed on a computing device. The monitoring module 106 may receive and evaluate the file 102 over a network 120 connection. In one example, the monitoring module 102 verifies whether code within the executable file 102 is obfuscated by a known obfuscator program or an unknown obfuscator program. An example of an obfuscator program may be a binary packer that compresses the contents of a file.

The unverified executable file 102 may include a plurality of strings 104, such as library strings. In one embodiment, the monitoring module 106 may include a string comparator 108 and a list of legitimate strings 110. The string comparator 108 may compare the strings 104 associated with the file 102 against the list of legitimate strings 110. A file verification module 122 may identify the file 102 as being obfuscated by a known or an unknown obfuscator program based on the comparison results produced by the string comparator 108. In one embodiment, if the verification module 122 identifies a file 102 as being obfuscated by an unknown obfuscator program, the file 102 may be processed according to an unverified file policy 124. For example, the policy 124 may indicate that the file 102 is blacklisted, blocked, erased, etc.

Figure 2:
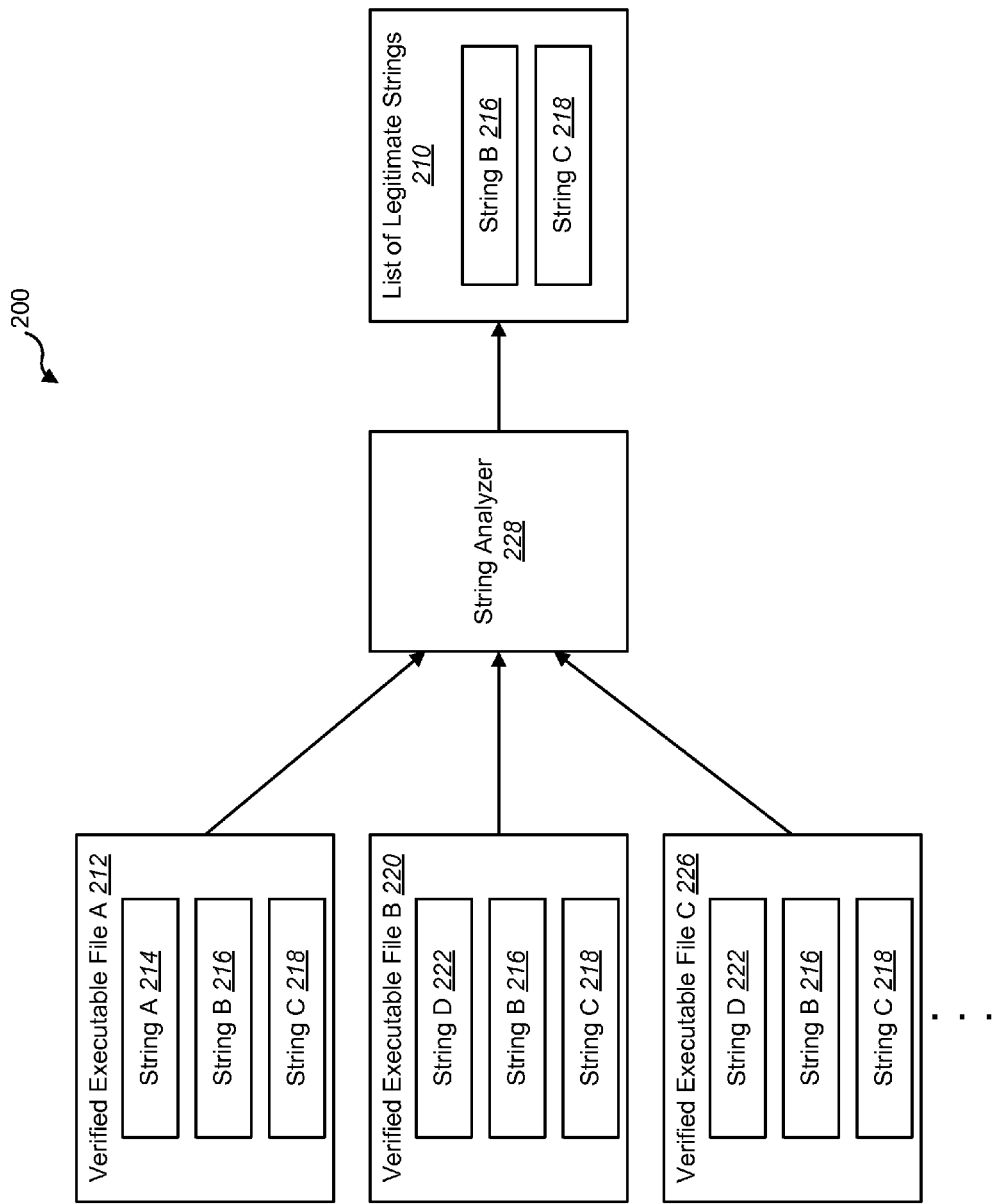
FIG. 2 is a block diagram illustrating one embodiment of a system for generating a list of legitimate strings.

FIG. 2 is a block diagram illustrating one embodiment of a system 200 for generating a list of legitimate strings 210. The system 200 may include the monitoring module 106 (not shown) or any other type of computing device. In one embodiment, multiple verified executable files 212, 220, 226 may be analyzed in order to generate the list 210. While only three files 212, 220, 226 are illustrated, more than three files may be analyzed. The files 212, 220, 226 used to generated the list 210 may be verified executable files. In one embodiment, the code within the executable files 212, 220, 226 may not be obfuscated or compressed in any fashion. In other words, the code within the verified executable files 212, 220, 226 may be legitimate and non-malicious code.

Each of the verified files 212, 220, 226 may include one or more library strings. For example, verified executable file A 212 may include string A 214, string B 216, and string C 218. In addition, verified executable file B 220 may include string D 222, string B, 216, and string C 218. Further, verified executable file C 226 may include string D 222, string B 216, and string C 218. While only three strings are illustrated in each file, more than three strings may be present in an executable file.

In one embodiment, the string analyzer 228 may analyze the strings in each file 212, 220, 226 to determine which strings are common among each of the files 212, 220, 226. For example, as illustrated, string B 216 and string C 218 are common among each of the verified executable files 212, 220, 226. The string analyzer 228 may generate the list of legitimate strings 210. The list 210 may include the strings that are common among each of the analyzed executable files 212, 220, 226. In other words, in this example, the generated list 210 may include string B 216 and string C 218.

As previously mentioned, an unverified executable file 102 that may be obfuscated (e.g., compressed) may be analyzed to determine whether the unverified file 102 includes strings included in the list of legitimate strings 210. If the file 102 includes strings that are on the list 210, the unverified file 102 may be identified as having been obfuscated (or compressed) by a known obfuscator program. However, if the unverified file 102 does not include the strings that are on the list 210, the file 102 may be identified as being obfuscated by an unknown obfuscator program.

Figure 3:
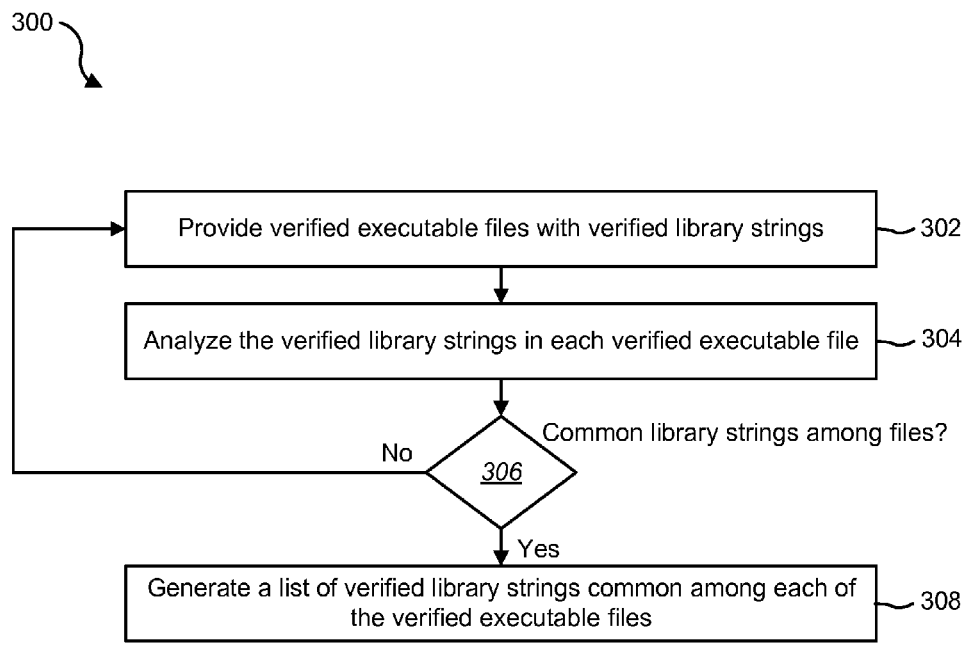
FIG. 3 is a flow diagram illustrating one embodiment of a method for generating a list of verified library strings.

FIG. 3 is a flow diagram illustrating one embodiment of a method 300 for generating a list of verified library strings. In one embodiment, the method 300 may be implemented by an antivirus engine running on a computing device. In one configuration, verified executable files that include verified library strings may be provided 302. The code within the executable files may not be obfuscated or compressed in any form. The verified library strings in each verified executable file may be analyzed 304. In one embodiment, a determination 306 may be made as to whether common library strings exist among each of the verified executable files. If it is determined 306 that there are no common library strings among the files, the method 300 may return to provide 302 additional verified executable files with library strings. However, if it is determined 306 that common library strings exist in each of the verified executable files, a list may be generated 308. In one embodiment, the list may include the verified library strings that are common among each of the verified executable files.

Figure 4:
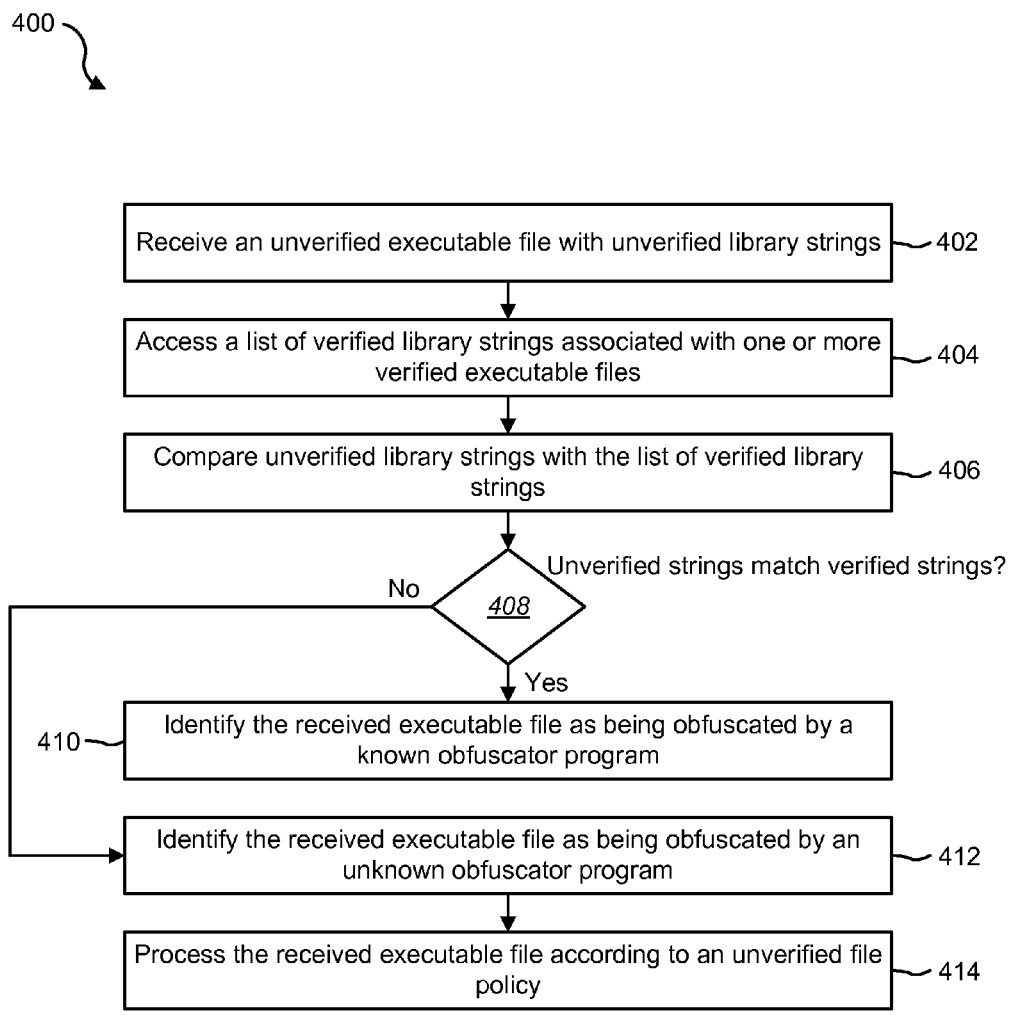
FIG. 4 is a flow diagram illustrating one embodiment of a method for identifying a file as being obfuscated by an unknown obfuscator program.

FIG. 4 is a flow diagram illustrating one embodiment of a method 400 for identifying a file as being obfuscated by an unknown obfuscator program. In one embodiment, the method 400 may be implemented by a monitoring module 106, such as, without limitation, an antivirus engine running on a computing device. In one configuration, an unverified executable file may be received 402. The file may include unverified library strings that are obfuscated in some manner.

A list of verified library strings may be accessed 404. The list may include library strings that are common among multiple verified executable files. In one embodiment, the list may be generated according to the method 300 previously described. The unverified library strings may be compared 406 with the verified library strings included in the list. In one embodiment, a determination 408 may be made as to whether any of the unverified library strings match any of the verified library strings from the list. In other words, the unverified library strings may be scanned to determine 408 whether the unverified executable file includes library strings that are common among non-malicious, verified executable files that include non-obfuscated code.

If it is determined 408 that unverified strings within the unverified executable file match verified strings on the list, the received executable file may be identified 410 as being obfuscated by a known obfuscator program. The executable file may be verified as a low risk for including malicious code that is obfuscated among legitimate code. However, if it is determined 408 that the unverified library strings do not match the verified library strings, the received file may be identified 412 as being obfuscated by an unknown obfuscator program. In other words, the unverified executable file may be marked as a high risk for including malicious code that is hidden (or obscured) among legitimate code. The high-risk executable file may be processed 414 according to an unverified file policy. For example, the executable file may be erased, blocked, blacklisted, etc. In addition, the policy may indicate that a user is queried to determine how to handle the high-risk executable file. Identifying executable files that are obfuscated by unknown obfuscator programs may prevent malicious code within the file from being executed.

Figure 5:
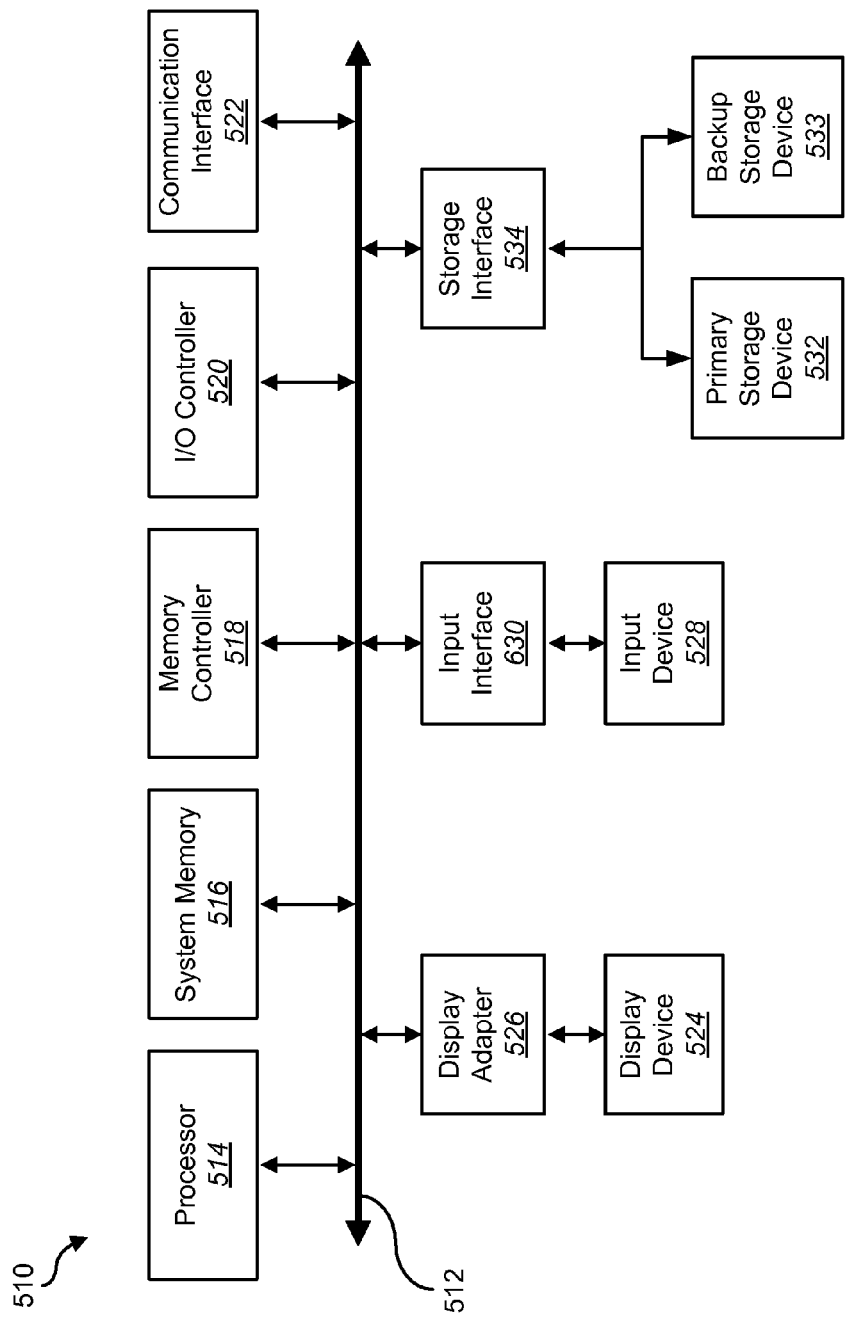
FIG. 5 is a block diagram of an exemplary computing system 510 capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In a basic configuration, computing system 510 may comprise at least one processor 514 and system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the receiving, accessing, determining, and identifying steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may comprise both a volatile memory unit (such as, for example, system memory 516) and a non-volatile storage device (such as, for example, primary storage device 532, as described in detail below).

In certain embodiments, exemplary computing system 510 may also comprise one or more components or elements in addition to processor 514 and system memory 516. For example, as illustrated in FIG. 5 computing system 510 may comprise a memory controller 518, an I/O controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the steps or features described and/or illustrated herein, such as receiving, accessing, determining, and identifying.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for receiving, accessing, determining, and identifying steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network comprising additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network or a wireless IEEE 802.11 network), a personal area network (such as a BLUETOOTH or IEEE Standard 802.15.1-2002 network), a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the receiving, accessing, determining, and identifying steps disclosed herein. Communication interface 522 may also be used to perform and/or be a means for performing other steps and features set forth in the instant disclosure.

As illustrated in FIG. 5, computing system 510 may also comprise at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also comprise at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the receiving, accessing, determining, and identifying steps disclosed herein. Input device 528 may also be used to perform and/or be a means for performing other steps and features set forth in the instant disclosure.

As illustrated in FIG. 5, exemplary computing system 510 may also comprise a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also comprise other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Storage devices 532 and 533 may also be used, for example, to perform and/or be a means for performing, either alone or in combination with other elements, one or more of the receiving, accessing, determining, and identifying steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
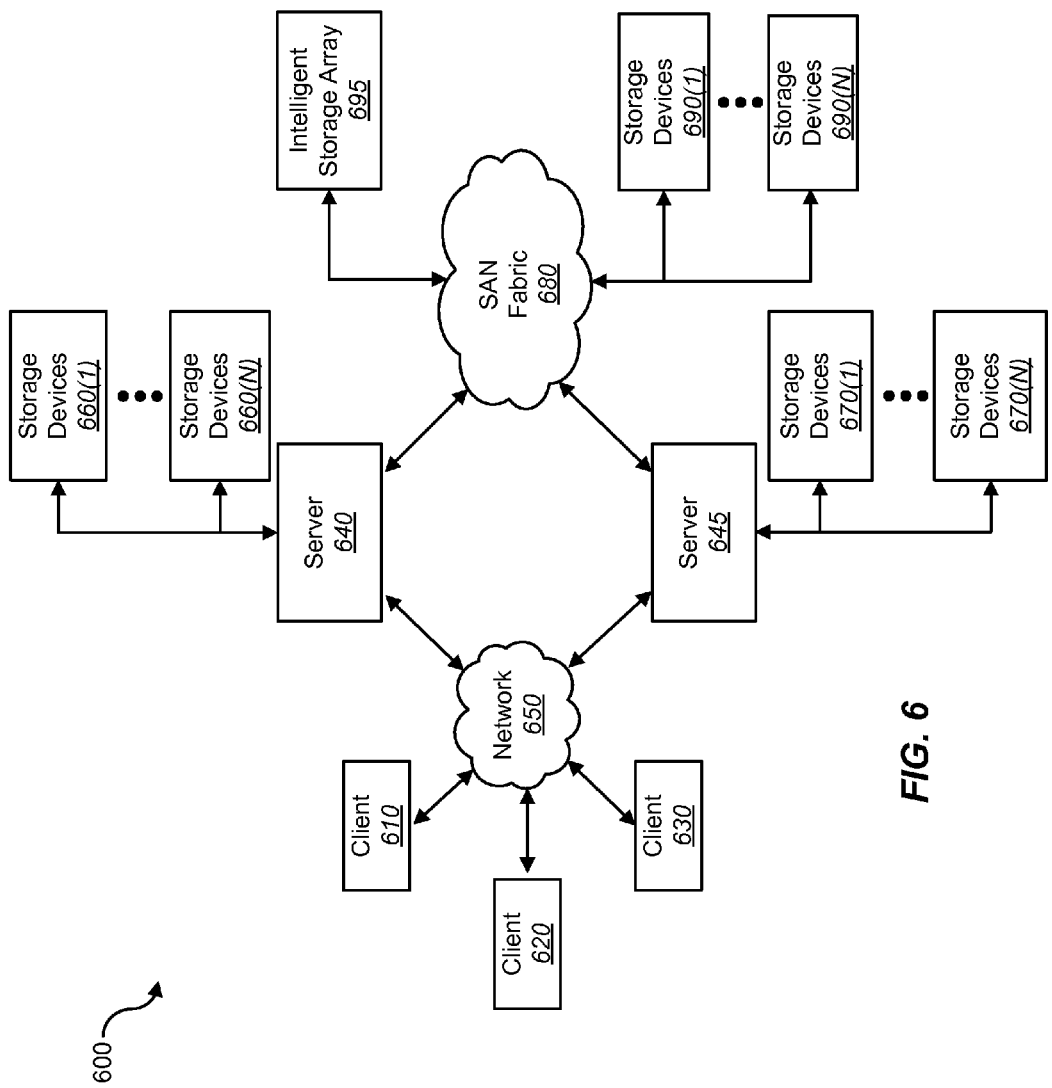
FIG. 6 is a block diagram of an exemplary network architecture in which client systems and servers and may be coupled to a network.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or to run certain software applications. Network 650 generally represents any telecommunication or computer network; including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 780 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the receiving, accessing, determining, and identifying steps disclosed herein. Network architecture 600 may also be used to perform and/or be a means for performing other steps and features set forth in the instant disclosure.

As detailed above, computing system 510 and/or one or more of the components of network architecture 600 may perform and/or be a means for performing, either alone or in combination with other elements, one or more steps of the exemplary methods described and/or illustrated herein. For example, computing system 510 and/or one or more of the components of network architecture 600 may perform and/or be a means for performing a computer-implemented method for maintaining file-type information for a file that may comprise: 1) receiving an unverified executable file comprising obfuscated library strings, 2) accessing a list of pre-verified library strings, 3) determining if the unverified executable file comprises one or more of the pre-verified library strings, and 4) identifying the unverified executable file as being obfuscated by an unknown obfuscator program if the file does not comprise one or more of the pre-verified library string.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of". In addition, for ease of use, the words "including" and "having," as used in the specification and claims, are interchangeable with and have the same meaning as the word "comprising."

What is claimed is:

1. A method for analyzing an unverified executable file within an antivirus engine to identify the executable file as being obfuscated by an unknown obfuscator program, the method comprising:
   receiving an unverified executable file comprising a plurality of obfuscated library strings and obfuscated executable code;
   accessing a list of a plurality of pre-verified library strings;
   determining if a match exists between at least a portion of one of the obfuscated library strings of the unverified executable file and at least a portion of one of the pre-verified library strings; and
   upon determining the absence of a match, marking the unverified executable file as being an executable file obfuscated by an unknown obfuscator program, wherein the mark represents a probability that the obfuscated executable code comprises malicious executable code.

2. The method of claim 1, further comprising processing the unverified executable file according to an unverified file policy if the file is identified as being obfuscated by an unknown obfuscator program.

3. The method of claim 2, wherein the unverified file policy comprises instructions to delete the unverified executable file.

4. The method of claim 2, wherein the unverified file policy comprises instructions to provide an inquiry to a user regarding the processing of the unverified executable file.

5. The method of claim 2, wherein the unverified file policy comprises instructions to block the execution of the unverified executable file.

6. The method of claim 1, wherein the unknown obfuscator program is a binary packer program configured to obfuscate the contents of the unverified executable file.

7. The method of claim 1, further comprising providing multiple executable files comprising library strings.

8. The method of claim 7, wherein the executable files comprise code that is not obfuscated.

9. The method of claim 7, further comprising identifying one or more library strings included in each of the multiple executable files.

10. The method of claim 9, further comprising generating the list of pre-verified library strings that comprises the one or more library strings included in each of the multiple executable files.

11. A computer system configured to identify an unverified executable file as being obfuscated by an unknown obfuscator program, the computer system comprising:
   a processor;
   memory in electronic communication with the processor; and
   a monitoring module, the module configured to:
      receive an unverified executable file comprising a plurality of obfuscated library strings and obfuscated executable code;
      access a list of a plurality of pre-verified library strings;
      determine if a match exists between at least a portion of one of the obfuscated library strings of the unverified executable file and at least a portion of one of the pre-verified library strings; and
      upon determining the absence of a match, mark the unverified executable file as being an executable file obfuscated by an unknown obfuscator program, wherein the mark represents a probability that the obfuscated executable code comprises malicious executable code.

12. The computer system of claim 11, wherein the monitoring module is further configured to process the unverified executable file according to an unverified file policy if the file is identified as being obfuscated by an unknown obfuscator program.

13. The computer system of claim 12, wherein the unverified file policy comprises instructions to delete the unverified executable file, provide an inquiry to a user regarding the processing of the unverified executable file, or block the execution of the unverified executable file.

14. The computer system of claim 11, wherein the unknown obfuscator program is a binary packer program configured to obfuscate the contents of the unverified executable file.

15. The computer system of claim 11, wherein the monitoring module is further configured to provide multiple executable files comprising library strings.

16. The computer system of claim 15, wherein the executable files comprise code that is not obfuscated.

17. The computer system of claim 15, wherein the monitoring module is further configured to identify one or more library strings included in each of the multiple executable files.

18. The computer system of claim 17, wherein the monitoring module is further configured to generate the list of pre-verified library strings that comprises the one or more library strings included in each of the multiple executable files.

19. A computer-program product for identifying an unverified executable file as being obfuscated by an unknown obfuscator program, the computer-program product comprising a non-transitory computer-readable storage medium having instructions thereon, the instructions comprising:
   code programmed to receive an unverified executable file comprising a number of obfuscated library strings and obfuscated executable code;
   code programmed to access a list of a number of pre-verified library strings;
   code programmed to determine if a match exists between at least a portion of one obfuscated library string of the unverified executable file and at least a portion of one of the pre-verified library strings; and
   upon determining the absence of a match, code programmed to mark the unverified executable file as being an executable file obfuscated by an unknown obfuscator program, wherein the mark represents a probability that the obfuscated executable code comprises malicious executable code.

20. The computer-program product of claim 19, wherein the instructions further comprise code programmed to provide multiple executable files comprising library strings, identify one or more library strings included in each of the multiple executable files, and generate the list of pre-verified library strings that comprises the one or more library strings included in each of the multiple executable files.

* * * * *